US012498431B2

United States Patent
Ibrahim et al.

(10) Patent No.: US 12,498,431 B2
(45) Date of Patent: Dec. 16, 2025

(54) METHODS AND SYSTEMS FOR FAULT DETECTION ON DIRECT CURRENT POWER LINES

(71) Applicant: Cence Power Inc., Markham (CA)

(72) Inventors: Bolis Ibrahim, Toronto (CA); Sagar Jaiswal, Milton (CA); Jaideep Singh, Toronto (CA)

(73) Assignee: Cence Power Inc., Markham (CA)

( * ) Notice: Subject to any disclaimer, the term of this patent is extended or adjusted under 35 U.S.C. 154(b) by 220 days.

(21) Appl. No.: 18/345,013

(22) Filed: Jun. 30, 2023

(65) Prior Publication Data

US 2025/0004069 A1    Jan. 2, 2025

(51) Int. Cl.
  *G01R 31/58*    (2020.01)
  *H02H 9/02*    (2006.01)

(52) U.S. Cl.
  CPC .............. *G01R 31/58* (2020.01); *H02H 9/02* (2013.01)

(58) Field of Classification Search
  CPC ........ G01R 31/08; G01R 31/52; G01R 31/28; G01R 31/085; G01R 31/315; G01R 31/58; G01R 31/11
  USPC .......................................................... 361/57
  See application file for complete search history.

(56) References Cited

U.S. PATENT DOCUMENTS

| | | | |
|---|---|---|---|
| 3,668,659 A | 6/1972 | Hutchings | |
| 6,091,338 A * | 7/2000 | Natra | H04M 1/745 379/22.04 |
| 8,781,637 B2 | 7/2014 | Eaves | |
| 9,184,795 B2 | 11/2015 | Eaves | |
| 10,104,610 B2 | 10/2018 | Heidler et al. | |
| 10,714,930 B1 | 7/2020 | Weiss et al. | |
| 10,732,688 B2 | 8/2020 | Goergen et al. | |
| 11,063,630 B2 | 7/2021 | Arduini et al. | |
| 2014/0306634 A1* | 10/2014 | Sakai | H02P 27/085 318/490 |
| 2021/0382102 A1* | 12/2021 | Siddique | H02H 3/445 |
| 2022/0050135 A1* | 2/2022 | Nordin | G01R 31/086 |
| 2023/0040876 A1* | 2/2023 | Potterf | H04L 12/10 |
| 2023/0221380 A1* | 7/2023 | Shea | G01R 19/16571 361/42 |
| 2024/0412594 A1* | 12/2024 | Shepherd | G07F 17/3239 |

* cited by examiner

*Primary Examiner* — Danny Nguyen
(74) *Attorney, Agent, or Firm* — Rowand LLP (57) ABSTRACT

A fault detection system for detecting a fault condition on a direct current (DC) transmission line. The system may include a transmitter including a DC source to energize a transmission line and a receiver connected to the transmission line and including a signal generator to generate a periodic signal at or near a resonant frequency. The transmitter may include a termination impedance higher than a characteristic impedance of the transmission line to reflect substantially all the periodic signal to establish a standing wave on the transmission line. The transmitter may include a first fault detection circuit coupled to the transmission line to detect an amplitude attenuation of the standing wave of more than a threshold amount and, in response, to disconnect the transmission line from the DC source.

19 Claims, 6 Drawing Sheets

METHODS AND SYSTEMS FOR FAULT DETECTION ON DIRECT CURRENT POWER LINES

FIELD

The present application generally relates to direct current (DC) power lines and, in particular, to methods and systems for fault detection on high voltage DC power lines.

BACKGROUND

High voltage power lines can be dangerous. DC can be a desirable option for power transmission in some cases so as to minimize alternating current (AC) line losses and to minimize AC-DC conversions in the case of DC loads. However, DC can be dangerous in that it does not have zero-crossings that can serve to self-extinguish an arc. In order to safely transmit high voltage DC power, a very high-speed fault detection mechanism is needed. For example, in a 450V rated system a clearing time for low resistance ground faults is about 5.4 milliseconds.

DC power transmission can be implemented as a two-wire system or a three-wire system. Faults can be human contact (one wire touch, or two wire touch), short circuit, open circuit, over voltage, or over current. Human contact can be dangerous and sometimes even fatal. Fast fault detection and power disconnection is an important safety feature.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes a fault detection system for detecting a fault condition on a direct current (DC) transmission line. The system may include a transmitter including a DC source to energize a transmission line; and a receiver connected to the transmission line to couple the transmission line to a load, and including a signal generator to generate a periodic signal at or near a resonant frequency and coupled to the transmission line through an impedance matching resistor. The transmitter may include a termination impedance higher than a characteristic impedance of the transmission line to reflect substantially all the periodic signal thereby establishing a standing wave on the transmission line. The transmitter may include a first fault detection circuit coupled to the transmission line to detect an amplitude attenuation of the standing wave of more than a threshold amount and, in response, to disconnect the transmission line from the DC source.

In some implementations, the resonant frequency is a frequency at which the standing wave on the transmission line is at a maximum amplitude.

In some implementations, the first fault detection circuit includes an amplifier to amplify the standing wave to produce an amplified signal and a touch detection circuit to detect an attenuation of the amplified signal. The touch detection circuit may include a peak detector to output a peak voltage signal at the amplitude of the amplified signal, and attenuation detection circuitry for determining if the amplitude of the amplified signal decreases by more than the threshold amount. The touch detection circuit may include a first voltage follower and a second voltage follower in parallel with the first voltage follower and having a time delay, and wherein the first voltage follower and the second voltage follower are coupled to inputs of a difference amplifier and a comparator to detect a change in amplitude of more than the threshold amount.

In some implementations, the first fault detection circuit includes a line discharge circuit configured to couple the transmission line to ground through a discharge resistor if the amplitude attenuation of the standing wave is more than the threshold amount. In some cases, the line discharge circuit includes a MOSFET.

In some implementations, the receiver includes a second fault detection circuit coupled to the transmission line to detect the amplitude attenuation of the standing wave of more than the threshold amount and, in response, to disconnect the transmission line from the load. In some cases, the second fault detection circuit includes a second line discharge circuit configured to couple the transmission line to ground through a second discharge resistor if the amplitude attenuation of the standing wave is more than the threshold amount.

In some implementations, the first fault detection circuit and the termination impedance are coupled to the transmission line through a blocking capacitor selected to block high voltage DC signal from the first fault detection circuit and the termination impedance.

In some implementations, the termination impedance includes a termination resistor and a termination capacitor in series.

In some implementations, the signal generator is a sine wave generator, and wherein the periodic signal is a sinusoidal signal. In some cases, the receiver further includes a microcontroller coupled to the a receiver-side peak detector and configured to control the sine wave generator, and wherein the microcontroller is configured to cause the sine wave generator to perform a frequency sweep between a minimum frequency and a maximum frequency and, based on a peak voltage signal from the receiver-side peak detector, to determine the resonant frequency based on a maximum amplitude of the peak voltage signal.

In some implementations, the periodic signal has a peak-to-peak amplitude between 10V and 24V.

In some implementations, the DC transmission line is configured to operate at more than 60 VDC.

In another aspect, the present application describes a fault detection system for detecting a fault condition on a direct current (DC) transmission line. The system may include a transmitter including a power source to energize a transmission line with high voltage DC power; and a receiver connected to the transmission line to couple the transmission line to a load, and including a signal generator to superimpose a sinusoidal signal on the high voltage DC power on the transmission line. The transmitter may include a termination impedance higher than a characteristic impedance of the transmission line to reflect substantially all the sinusoidal signal thereby establishing a standing wave on the transmission line. The transmitter may include a first fault detection circuit coupled to the transmission line through a first blocking capacitor and including first touch detection circuitry to detect an amplitude attenuation of the standing wave of more than a threshold amount and, in response, to disconnect the transmission line from the source and to couple the transmission line to ground through a first discharge resistor. The receiver may include a second fault detection circuit coupled to the transmission line through a second blocking capacitor and including second touch detection circuitry to detect the amplitude attenuation of the standing wave of more than the threshold amount and, in response, to couple the transmission line to ground through a second discharge resistor.

In some implementations, each of the first and second fault detection circuits include an amplifier to amplify the standing wave to produce an amplified signal and a touch detection circuit to detect an attenuation of the amplified signal.

In some implementations, each touch detection circuit includes a peak detector to output a peak voltage signal based on the amplified signal, and attenuation detection circuitry to signal if the amplitude of the amplified signal decreases by more than the threshold amount.

In some implementations, the attenuation detection circuitry includes a first voltage follower and a second voltage follower in parallel with the first voltage follower and having a time delay, and wherein the first voltage follower and the second voltage follower are connected to inputs of a difference amplifier and a comparator to detect a change in amplitude of more than the threshold amount.

In a further aspect, the present application describes a method of operating a high voltage DC transmission line, the transmission line having a power transmitter and a power receiver at respective ends. The method may include sending, from the transmitter to the receiver, a low voltage DC signal on the transmission line; powering electronics in the receiver using the low voltage DC signal, including a sine wave generator configured to generate and transmit an AC signal on the transmission line; detecting the AC signal at the power transmitter using a peak detector; determining that the detected AC signal is greater than a threshold level; and, in response to determining that the detected AC signal is greater than the threshold level, coupling the transmission line to a high voltage DC source to energizing the transmission line with high voltage DC power.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to fault detection for power lines and, in particular, fault detection for DC power lines.

In this application, the term "high voltage" is intended to include any voltage that is unsafe to humans or may cause harm to the surrounding environment. This may include, for example, class 4 power lines.

A human touch fault may be modeled as a high resistance ground fault (HRGF) in some cases. A fault detection system ideally quickly detects occurrence of this condition and disconnects power from the transmission line as a result. The time between contact and power shut off should be within the range of 3.78 milliseconds to 5.59 seconds for a corresponding current of 6 mA to 990 mA, based on requirements of the UL 943 standard relating to ground-fault circuit interrupters.

Figure 1A:
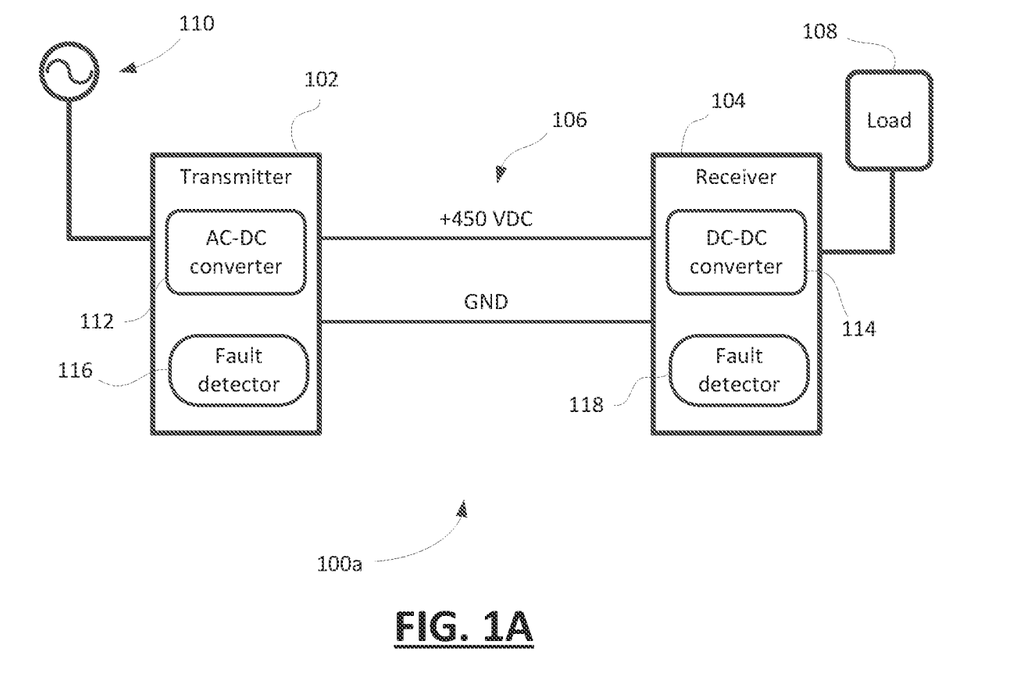
FIG. 1A diagrammatically illustrates an example of a basic DC power two-wire transmission system.

FIG. 1A diagrammatically illustrates an example of a basic DC power two-wire transmission system 100a. The system 100a includes a power transmitter 102 at one end of a transmission line 106 and a power receiver 104 at the other end of the transmission line 106. In some examples, the power receiver 104 may be a transceiver, enabling the chaining of successive transmission lines from transceiver to transceiver.

In this example, the receiver 104 is coupled to a DC load 108. The transmitter 102 is connected to an AC power source 110, such as AC mains. The transmitter 102 may include a high power AC-DC converter 112 configured to produce high voltage DC power from the input AC power. In this example, the system 100a operates at +450 VDC. In this two-wire example, it will be noted that one wire is at ground and the other wire is at +VDC. The receiver 104 may include a DC-DC converter 114 to convert the +450 VDC to whatever DC voltage level is required by the load 108, and whatever VDC may be used internally at the receiver 104 for electronics and logic.

In this example, the transmitter 102 includes a fault detector 116 and the receiver includes a fault detector 118. The fault detectors 116, 118 are configured to quickly detect a fault on the transmission line 106, and in response to quickly disconnect the transmission line 106 from the AC power source 110 and to de-energize the transmission line 106.

Figure 1B:
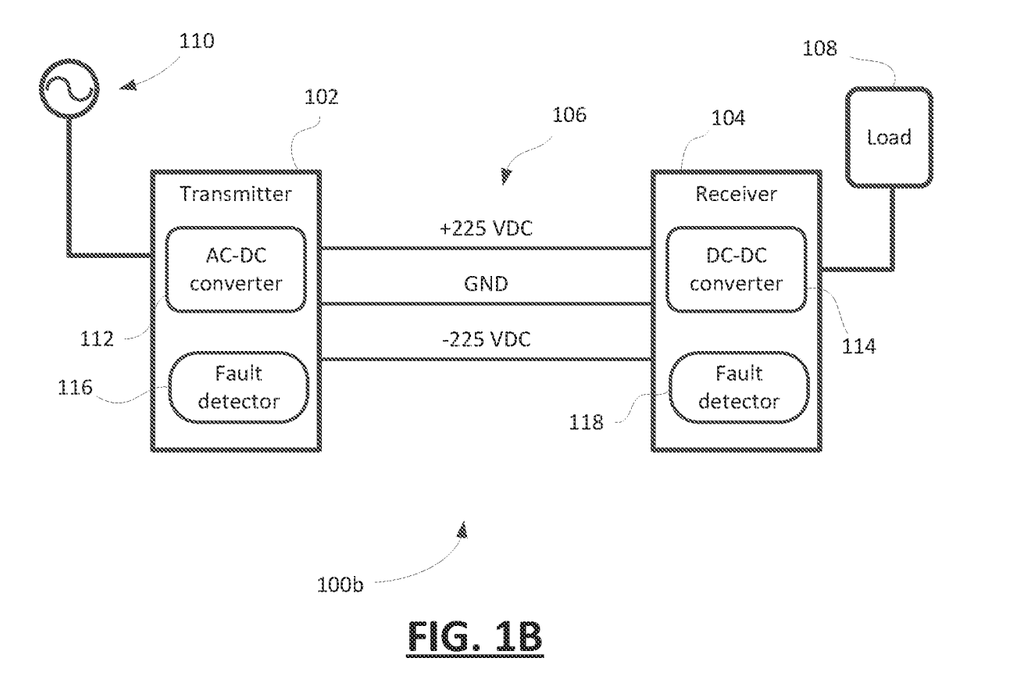
FIG. 1B diagrammatically shows an example of a three-wire DC transmission system.

FIG. 1B shows an example of a three-wire DC transmission system 100b. The three-wire DC transmission system 100b includes a transmission line 106 that features a ground wire, a +VDC wire and a −VDC wire. In this example, the same DC voltage of +450 VDC is achieved, but through setting the positive wire to +225 VDC and setting the negative wire to −225 VDC.

As noted above, high speed fault detection is advantageous. Various UL standards, including UL 943 and UL1400-1, address the issue of fault-management.

Fault detection in electrical systems may sometimes employ residual current detection (RCD) as the mechanism for identifying a fault condition. It has been found that RCD has insufficient sensitivity to reliably generate a fault detection from human touch. Increasing the number of turns of live wire for detection can improve sensitivity but results in longer clearing time and a shock sensation. Typical ground-fault circuit interrupters are too slow and are better suited to AC fault detection.

At least one attempt has been made to carry out fault detection by sending a low-frequency pulsed signal from the power transmitter to the power receiver and determining, from measured reflections, the reflection coefficient and, thus, the normal impedance of the transmission line. A change in the measured impedance may signal a possible fault. This technique still ends up being too slow for effective quick fault detection and disconnection.

The present application describes a fast fault detection system and method for DC power. The system detects faults through first establishing a standing wave on the transmission line. The standing wave may be a sinusoidal signal superimposed on the DC voltage signal on the transmission line. If the standing wave is established at or near a resonant frequency for the transmission line, the magnitude of the standing wave and its amplitude change when subject to a fault condition will approach maximums, making the change detectable at either or both the transmitter or receiver ends of the transmission line. If the amplitude of the standing wave is attenuated by more than a threshold amount, it is indicative of a fault condition and the load and DC power source may be quickly disconnected from the line. In some implementations, a line discharge circuit may be used at one or both ends of the line to discharge the line when a fault is detected and the load and source are disconnected.

Advantageously, using a periodic signal generator at the receiving end means that the fault detection system may further be leveraged to engage in a handshaking process prior to energizing the line with high voltage DC power from a power source. This handshaking process may improve safety of the transmission line through enabling using an initial low voltage AC signal from the periodic signal generator to confirm the line is correctly connected and ready for high voltage energy. This may eliminate or reduce the risk of high voltage arcs/faults.

The present system may further enable chaining of termination points, wherein the receiver is constructed as a transceiver enabling it to serve as a receiver termination end for a first portion of the transmission line and as a transmitter termination end for a subsequent portion of the transmission line.

Figure 2:
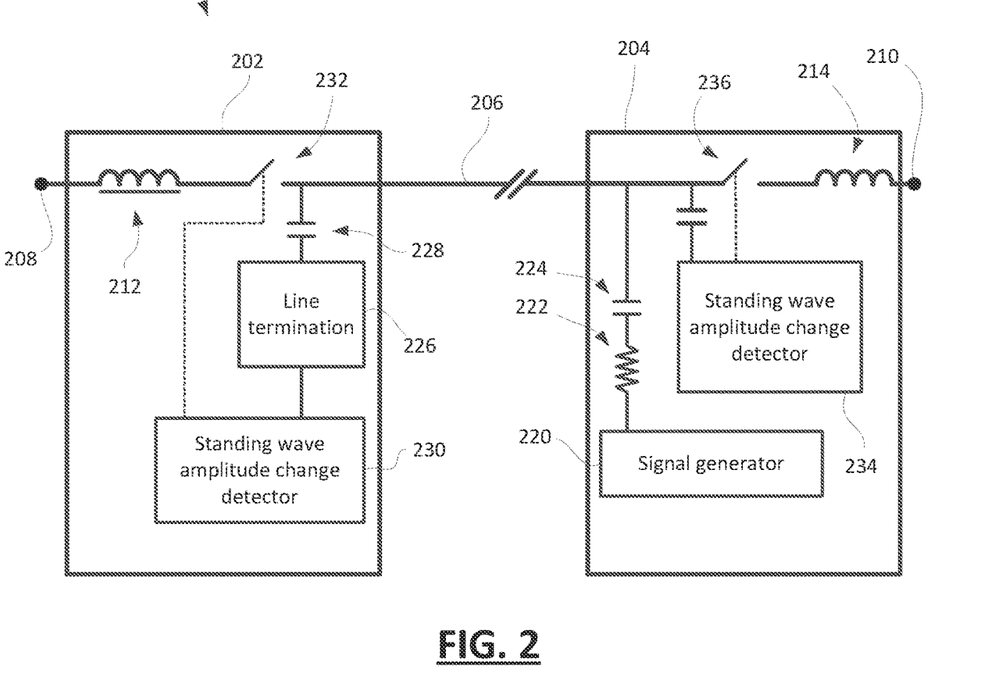
FIG. 2 shows one simplified example fault detection system for DC power transmission.

Reference will now be made to FIG. 2 which shows one simplified example fault detection system 200 for DC power transmission. The system 200 in this example includes a transmitter 202 and a receiver 204 at respective ends of a transmission line 206. The transmission line 206 may be a two-wire cable in some implementations and may be a three-wire cable in some implementations. The system 200 is configured to connect a DC source 208 to a load 210. In some cases, the transmitter 202 may include power conversion components (not shown) to convert DC-to-DC and/or to convert AC-to-DC to realize the DC source 208. For example, the transmitter 202 may be connected to AC mains power and may include one or more power converters to realize the DC source 208 for producing high voltage DC power. The DC source 208 may provide up to 450 VDC in some implementations. Other voltage levels may be used in other implementations.

In this example, the DC source 208 is coupled to the transmission line 206 through a source filter inductor 212 and the transmission line 206 is coupled to the load 210 through a load filter inductor 214. The filter inductors 212, 214 may, in part, isolate the transmission line 206 from either the DC source 208 or the load 210. This may protect components of the DC source 208 and/or the load 210 from AC signals on the transmission line 206, and may isolate the transmission line 206 from interference signals generated within the DC source 208 or the load 210 that may hamper fault detection.

The system 200 is configured to quickly detect a fault condition. The system includes a signal generator 220 configured to generate a periodic signal at the receiver 204 in this example. The periodic signal may be a sinusoidal signal in some implementations. Although other periodic signals may be generated, such as sawtooth, square wave, or other such signals, many implementations will use a sinusoidal signal since the standing wave established on the transmission line 206 will largely be sinusoidal such that the most energy efficient signal for the signal generator 220 to use is also a sinusoid.

The periodic signal is generated by the signal generator 220 at or near a resonant frequency of the transmission line 206. The resonant frequency may be determined empirically using a frequency sweep, as will be described further below. That is, the resonant frequency may be a measured quantity rather than a theoretical resonant frequency based on cable characteristics alone. The periodic signal may be generated at or near the resonant frequency. The term "near" in this context refers to a frequency sufficiently close to the resonant frequency that the resultant standing wave on the transmission line 206 has sufficient magnitude and sufficient sensitivity to fault conditions to produce a sufficient significant amplitude attenuation of the standing wave to be detectable. In empirical testing, frequencies sufficiently "near" the resonant frequency to meet these conditions are frequencies within approximately 5% of the value of the resonant frequency. That is, the frequency of the periodic signal in some examples is the resonant frequency ±5%.

To establish a standing wave on the transmission line 206, the system 200 includes a high impedance line termination 226 at the transmitter 202. The high impedance line termination 226 is coupled to the transmission line 206 through a blocking capacitor 228 to protect it from the high voltage DC energy on the transmission line 206. The line termination 226 is configured to reflect all or substantially all of the periodic signal. The line termination 226 and blocking capacitor 228 create a termination impedance at the transmitter 202 that is higher than the characteristic impedance of the transmission line 206 and, in many cases, is selected to be much higher than the characteristic impedance of the transmission line 206, so as to ensure that most of the incident wave from the signal generator 220 is reflected, thereby enabling the establishment of a standing wave on the transmission line 206.

The transmitter 202 includes a fault detection circuit, which in this example is a transmitter-side standing wave amplitude change detector 230. Similarly, the receiver 204 includes a fault detection circuit in the form of a receiver-side standing wave amplitude change detector 234. The transmitter-side standing wave amplitude change detector 230 is coupled to a switch 232 that couples the DC source 208 to the transmission line 206 such that if the transmitter-side standing wave amplitude change detector 230 detects a greater-than-threshold attenuation of the standing wave, it opens the switch to disconnect the transmission line 206 from the DC power source. Similarly, the receiver-side standing wave amplitude change detector 234 is coupled to a switch 236 that couples the transmission line 206 to the load 210 such that if it detects a greater-than-threshold attenuation of the standing wave then it opens the switch and disconnect the load 210 from the transmission line 206. In some implementations, only the transmitter includes a standing wave amplitude change detector and an associated switch for disconnection; however, implementations in which both ends include such detection and disconnection capability may realize improved speed and safety under a fault condition.

Figure 7:
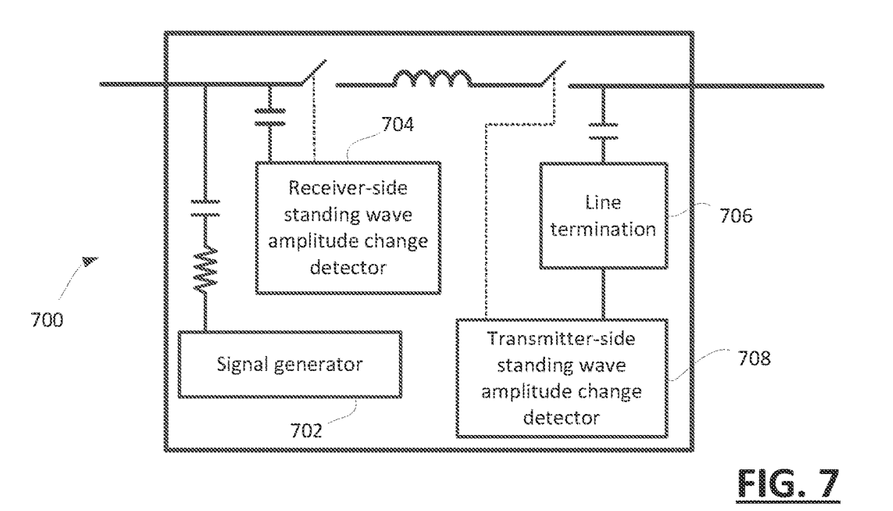
FIG. 7 shows a simplified example diagram of a transceiver for fault detection.

FIG. 7 shows an example transceiver 700 that may function as a receiver for fault detection at one end of a section of transmission line and as a transmitter for fault detection in a subsequent section of transmission line. The transceiver 700 enables the daisy-chaining of sections of transmission line to facilitate longer distance DC power transmission. It will be noted that the example transceiver 700 includes, at its receiver side, a signal generator 702 and a receiver-side standing wave amplitude change detector 704. At its transmitter side, the transceiver 700 includes a line termination 706 for reflecting the incident periodic signal from the next transceiver in the chain, and a transmitter-side standing wave amplitude change detector 708. An inductor is shown isolating the receiver-side from the transmitter-side; however, it will be appreciated that this is a simplification and additional elements, including one or more DC power amplifiers (not shown), may be included.

Figure 3:
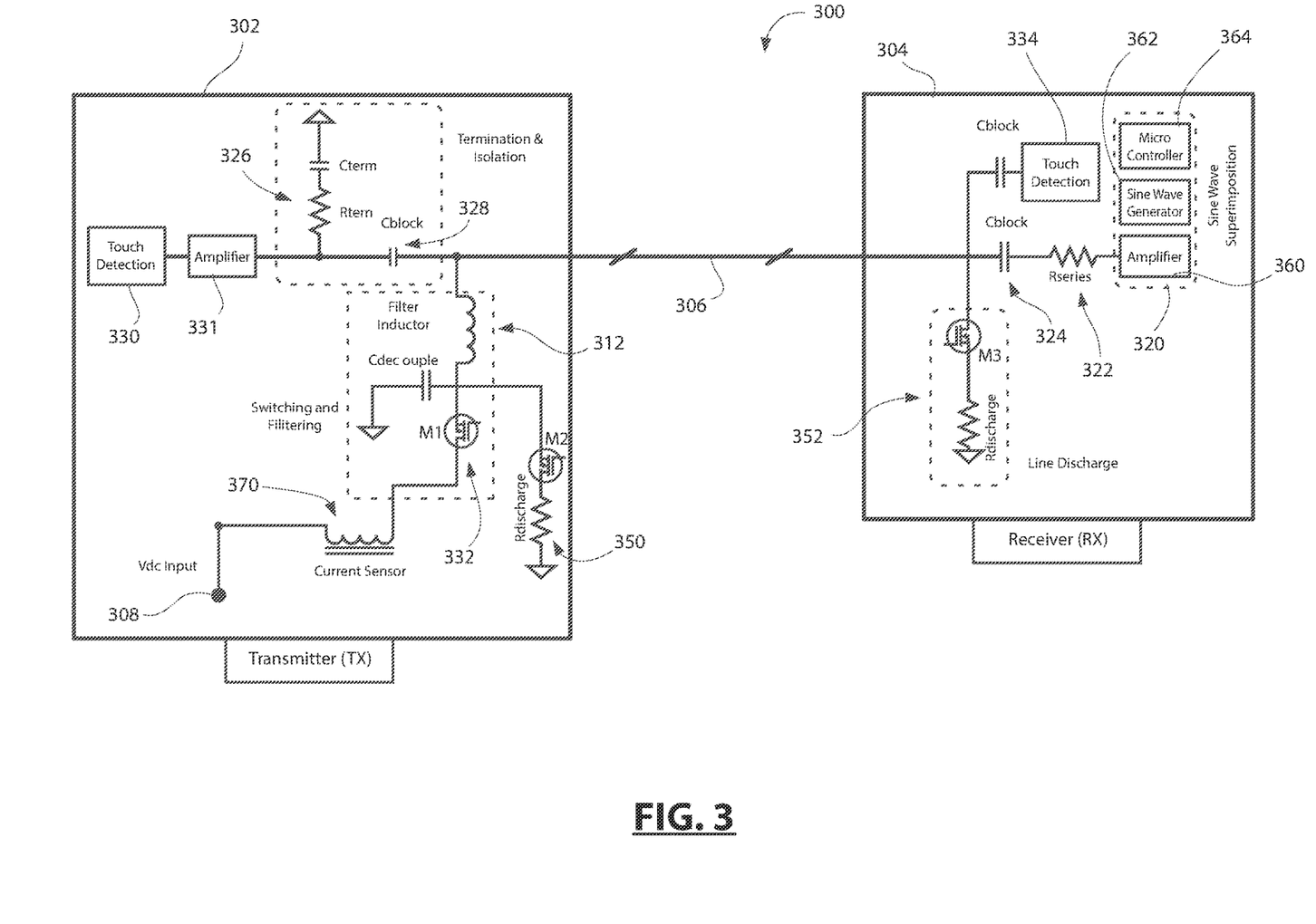
FIG. 3 shows a simplified circuit diagram of one example system for fault detection in a DC power system.

Reference will now be made to FIG. 3, which shows a simplified circuit diagram of one example system 300 for fault detection in a DC power system. The system 300 in this example includes a transmitter 302 and a receiver 304 at respective ends of a transmission line 306. The transmission line 306 may be a two-wire cable in some implementations and may be a three-wire cable in some implementations. The system 300 is configured to connect a VDC input power source 308 to a load (not shown). The VDC input power source 308 may provide up to 450 VDC in some implementations. Other voltage levels may be used in other implementations.

In this example, the VDC input source 308 is coupled to the transmission line 306 through a source filter inductor 312. The filter inductor 312 may, in part, isolate the transmission line 306 from the VDC input source 308 to protect components of the VDC input source 308 from AC signals on the transmission line 306, and/or to isolate the transmission line 306 from interference due to transient signals or noise generated within the VDC input source 308 that may hamper fault detection.

The receiver 304 includes a signal generator 320 to generate a periodic signal for transmission on the transmission line 306. The transmitter 302 includes a termination impedance 326 formed from a termination resistor and termination capacitor and coupled to the transmission line 306 through a blocking capacitor 328. The termination impedance 326 is configured to have an impedance higher, and in some cases significantly higher, than the characteristic impedance of the transmission line 306, so as to ensure most or all of the incident periodic signal from the signal generator 320 is reflected.

The periodic signal, which in this example is a sinusoidal signal, is generated at or near the resonant frequency of the transmission line 306. The termination impedance 326 reflects all, or at least most, of the incident energy and enables establishment of a standing wave on the transmission line 306 at or near the resonant frequency. This standing wave is superimposed on the DC power signal energizing the transmission line 306. In some cases, the frequency of the signal is between about 5 kHz and 4 MHz. In one example, the frequency is selected based on empirical measurement of the resonant frequency of the transmission line 306. In one specific test implementation, the resonant frequency is about 400 kHz. In another specific test implementation, the resonant frequency is about 900 kHz.

The periodic signal is significantly lower in amplitude than the high voltage DC power signal in most implementations. In some examples, the DC power signal may be at around 450 VDC. The periodic signal may be at about 12 V peak-to-peak.

In this example implementation, the system 300 includes disconnection circuitry at the transmitter 302 to disconnect the VDC input source 308 from the transmission line 306 in the event of a fault detection and includes line discharge circuitry at both the transmitter 302 and receiver 304 for discharging capacitance on the line once a fault has been detected. At the transmitter 302, an amplifier 331 and transmitter-side touch detection circuitry 330 are provided to detect a fault condition through detecting a greater-than-threshold change in the standing wave amplitude on the transmission line 306. The amplifier 331 generates an amplified signal corresponding to the AC signal that passes through the blocking capacitor 328. The touch detection circuitry 330 controls a switch 332, which in this case is implemented using a MOSFET. Other or additional circuit elements may be used to implement the switch. A current sensor 370 may be used for overcurrent protection.

The touch detection circuitry 330 also controls transmitter-side discharge circuit 350, which in this example is implemented using a MOSFET and a discharge resistor. In the event of a detected fault condition, the transmitter-side touch detection circuitry 330 quickly opens the MOSFET of the switch 332 to disconnect the VDC input source 308 and closes the MOSFET of the transmitter-side discharge circuit 350 to quickly discharge the built-up energy on the transmission line 306.

At the receiver 304, receiver-side touch detection circuitry 334 is coupled to the transmission line 306 to detect the fault condition through detecting the greater-than-threshold change in the standing wave amplitude on the transmission line 306. The touch detection circuitry 334 controls a receiver-side discharge circuit 352 that is quickly closed when a fault condition is detected to couple the transmission line 306 to ground and discharge the line from the receiver end. In this example, the receiver-side discharge circuitry 352 is implemented using a MOSFET and a discharge resistor. In this manner, when a fault is detected by both the transmitter-side touch detection circuitry 330 and the receiver-side touch detection circuitry 334, then the VDC input source 308 is disconnected from the transmission line 306 and both ends of the transmission line 306 are quickly coupled to ground through discharge resistors as so to rapidly dissipate the charge on the line and avoid the risk of arcs, sparks or other hazards. By discharging both ends of the cable, the speed with which the line is de-energized is improved.

The signal generator 320 in this example includes a sine wave generator 362 and an amplifier 360. It further includes a suitably-programmed microcontroller 364 in this example. In some cases, the suitable-programmed microcontroller 364 may be replaced with an application-specific integrated circuit (ASIC) or another form of digital controller for controlling operation of the sine wave generator 362 and the amplifier 360. In some cases, the microcontroller 364 may further receive signals from the receiver-side touch detection circuitry 334. In some cases, the microcontroller 364 may be configured to control discharge of the line, output notification signals, and/or engage in a handshake process prior to energizing of the transmission line 306. In this example, the microcontroller 364 may be configured to set the frequency of the periodic signal generated by the sine wave generator 362. In some implementations, the microcontroller 364 may be configured to cause the sine wave generator 362 to perform a frequency sweep, generating a sine wave and gradually altering the frequency of the generated signal and measuring one or more parameters to determine a resonant frequency for the transmission line 306.

The signal generator 320 may be coupled to the transmission line 306 through a series resistor 322 and a blocking capacitor 324. The series resistor 322 serves as an impedance matching resistor and it modifies the series cable resistance so as to improve sensitivity of the touch detection. The series resistor 322 may provide impedance matching to reduce the 3-dB cutoff and to provide a resistance for the voltage of the sine wave to drop across when a fault on the cable occurs. The series resistor 322 may be particularly desirable in the case of a transmission line 306 that has a low total resistance relative to its total capacitance, such as in one example where the cable has a resistance of about 2.4 Ohms and a capacitance of about 68 nF. In some cases, the series resistor 322 may be selected to ensure that the total resistance in Ohms is approximately one third the total capacitance in nano-Farads.

The output of the sine wave generator 362 may be a periodic signal with a peak-to-peak amplitude of about 1.2 V. The amplifier 360 may increase the amplitude of the signal to about 12 V peak-to-peak. In other implementations, other voltage levels may be used. In some implementations, the transmission line operates at, at least, 300 VDC and the periodic signal has a peak-to-peak amplitude of between about 10V and 24V. In some cases, the transmission line may operate at any DC level over +60 VDC.

Figure 4:
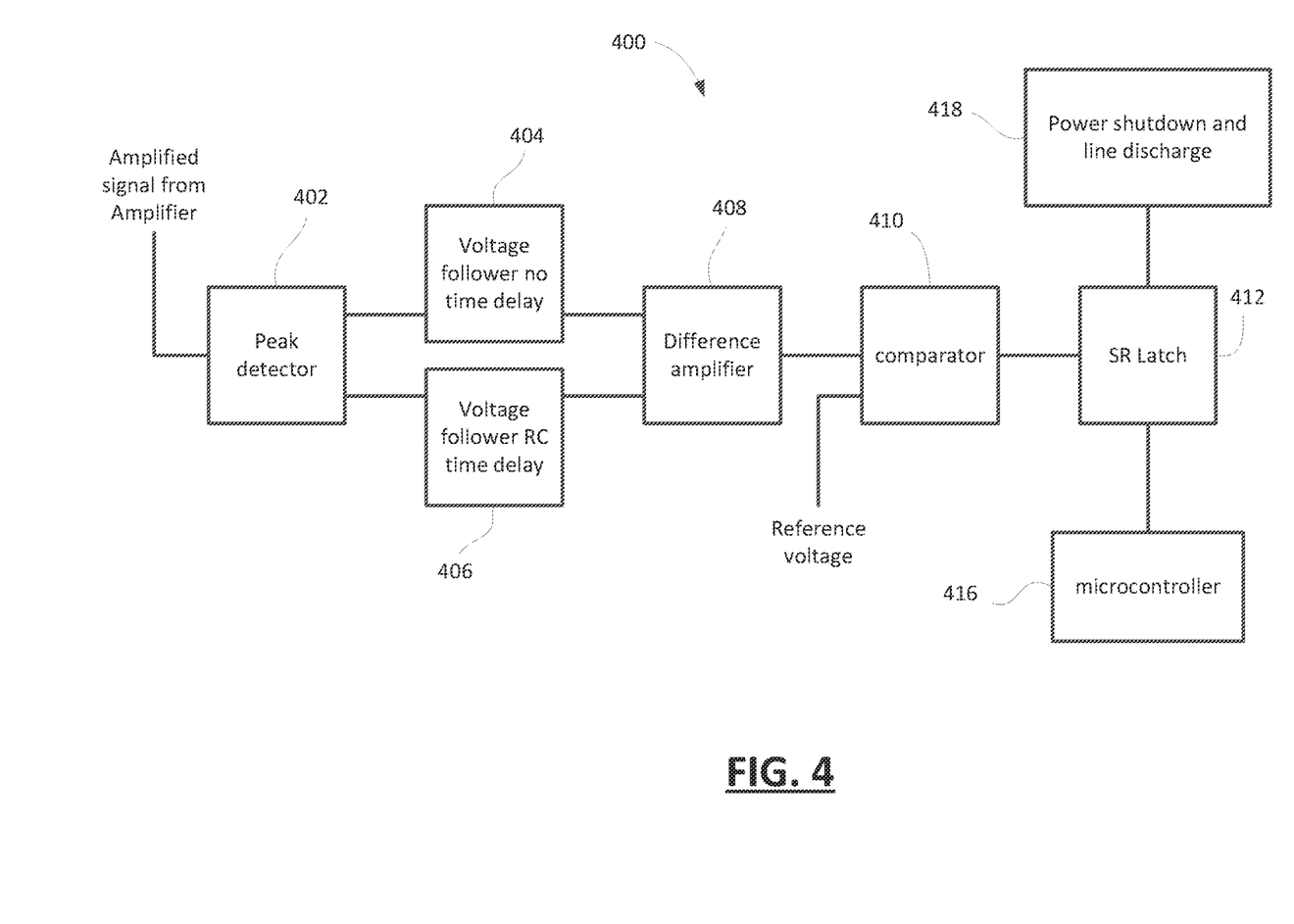
FIG. 4 shows one example, in block diagram form, of a standing wave attenuation detector.

Reference is now made to FIG. 4, which shows one example, in block diagram form, of a standing wave attenuation detector 400. The standing wave attenuation detector 400 receives an amplified standing wave signal from the transmission line. That is, an amplifier receives the standing wave sinusoidal signal on the transmission line, without DC offset since it is received through a blocking capacitor, and it amplifies the signal to create an amplified standing wave signal. The amplifier may be implemented using a band-pass active filter tuned to pass a band containing the frequency at which the sine wave generator produces the periodic signal. In some implementations a suitably configured operational amplifier and associated circuit components may be used.

The standing wave attenuation detector 400 includes a high-speed peak detector 402. The high-speed peak detector 402 outputs a peak voltage signal proportional to the peak of the amplified standing wave signal. The standing wave attenuation detector 400 is configured to detect a greater-than-threshold change, e.g. an attenuation, of the peak voltage signal from the high-speed peak detector 402, since that may be indicative of a fault on the transmission line, such as a human touch, short circuit, arc, or other fault condition.

In some examples, the peak voltage signal may be sampled, digitized, and input to a microcontroller to determine whether the voltage amplitude changes by more than a threshold amount. In these examples; however, high speed integrated circuit components are used to quickly detect a greater-than-threshold change in amplitude. The peak voltage signal may be input to attenuation detection circuitry configured to determine if the peak voltage signal decreases in magnitude by more than a threshold amount. In some cases, the peak voltage signal may be time delayed to produce a time-delayed peak voltage signal which may be input to a comparator along with a non-delayed version of the peak voltage signal. The comparator may thereby quickly detect if there is more than a threshold change in the peak voltage signal.

In this particular example embodiment, the peak voltage signal is input to a voltage follower 404 and into a voltage follower with time delay 406. In some cases, the voltage follower 404 may be eliminated; however, having both the delayed and non-delayed peak voltage signal pass through similar voltage follower circuits ensures that any distortion introduced by the voltage follower with time delay 406 is also present in the signal that comes out of the voltage follower 404.

The voltage follower 404 and the voltage follower with time delay 406 may be implemented using operational amplifiers with unity gain in some cases. A time delay is introduced using a resistor and capacitor at the input to the operational amplifier in the voltage follower with time delay 406. The capacitor and resistor may be selected to have an RC time constant that results in a suitable length delay. In some cases, the delay is designed to be about 200 ms.

It will be appreciated that if there is a change in voltage on the transmission line due to a fault condition, the peak voltage signal will change virtually immediately while the time delayed version of the peak voltage signal will not change for about 200 ms (or howsoever long the time constant is designed to be in the delay circuit). Nevertheless, because the non-delayed signal is compared to the delayed signal, the difference may be detected virtually instantaneously. In practical terms, detection of the amplitude change may occur within nanoseconds.

Both outputs from the voltage followers are fed to a precision difference amplifier 408. The difference amplifier 408 may amplify the difference between the signals so as to enable detection of differences as low as about 10 mV. It will be understood that when there is a fault condition on the transmission line, there will be an amplitude attenuation of the periodic signal superimposed on the line that is reflected in a change in the amplitude of the peak voltage signal. That change will appear more slowly in the time-delayed peak voltage signal such that there is a difference in the two inputs to the difference amplifier 408 for the duration of the delay introduced by the voltage follower with time delay 406. In some examples, this duration is about 200 ms.

The difference amplifier 408 is an operational amplifier-based circuit design to produce an output signal reflecting a high gain amplification of the difference between the two input signals. The gain may be in the order of 300 to 400 in some cases. A fault condition may produce a sufficiently large difference that amplification in the difference amplifier 408 results in saturation of the output to the supply rail voltage, e.g. 15V in some examples.

In some cases, the standing wave attenuation detector 400 may further include a comparator 410 configured to compare the output from the difference amplifier 408 with a preset threshold. The comparator 410 may serve to avoid false detection of faults based on amplification of relatively small differences in the peak voltage signal that may arise due to noise, signal interference on the transmission line, physical movement of the cable, or other small fluctuations or anomalies that may result in small changes to the standing wave that are not actually correlated to a fault condition. The resulting difference signal output by the difference amplifier 408 may be on the order of 3 to 8 V, and the comparator 410 may serve to ensure these detected amplitude attenuations are not detected as a fault condition. In different implementations, change to the gain of the difference amplifier 408 and or the set point of the comparator 410 may be adjusted to fine tune the standing wave attenuation detector 400.

The output of the comparator 410 may be used to trigger shutdown and discharge of the transmission line. In some cases, the output of the comparator 410 may be used to open/close MOSFET switches to disconnect the high voltage DC source from the transmission line and to couple the transmission line to ground through discharge resistors. In this example, the comparator output is input to a set-reset (SR) latch 412. If the input signal to the comparator 410 is greater than its set point, e.g. 10V, then the output signal from the comparator goes high, e.g. 15V in some implementations. That triggers the SR latch 412 to "set" sending a signal to one or more of the MOSFETs causing the power to be disconnected and the line discharged, as indicated by the power shutdown and line discharge block 418. A microcontroller 416 may be connected to the SR latch 412 to enable resetting of the SR latch 412 once the fault condition has been investigated and cleared and it has been determined that the transmission line may be energized and used again.

Advantageously, the above-described system can be implemented in a way that achieves high speed detection of a fault condition, and high speed disconnection and discharge of the transmission line. While other fault detection apparatuses may take as little as 1-3 milliseconds at best to detect a fault condition, the present application describes apparatuses that can detect a fault condition within microseconds and, in some implementations, within nanoseconds.

The time to detect a fault using the example standing wave attenuation detector described above depends on the time for the voltage of the sine wave to attenuate on the cable, which is partly dependent on the capacitance of the cable and the location of the fault on the cable relative to the detector. It further depends on the propagation delays of the amplifier, the peak detector, the voltage follower, the difference amplifier, the comparator, the SR latch, the shutoff and discharge logic gates, the shutoff and discharge MOSFET gate drivers, and the rise/fall time of the MOSFETs in the discharge/shutoff circuits.

The time it takes for the voltage of the sine wave to attenuate on the cable may be expressed as:

$$t = -RC \log_e \left(1 - 2 \times \frac{\text{Amplitude Distortion(V)}}{\text{Peak of Sine Wave(V)}}\right)$$

To give one example, 300 m of cable, such as CAT5E ethernet cable of 22 AWG size with 4 pairs of twisted unshielded wiring, has a resistance R of about 6 Ohms and a capacitance C of about 68 nF. Assuming a sine wave of 20V peak-to-peak and an amplitude distortion of about 50 mV, the time t is about 2 nanoseconds.

In another example, assuming the cable is 1000 m, the resistance R is about 24 Ohms and capacitance C is about 50 nF, which under similar conditions results in a propagation time t of 6 nanoseconds. Note that the R and C values are assumed in this modeling to be for the whole cable length and assume the fault event (e.g. a human touch) occurs at the opposite end of the cable. If the touch event occurs elsewhere, the R and C values may be different and dependent on the distance between the point of touch and the detector.

A typical amplifier may have a propagation delay of about 5 ns. The op amps of the peak detector and voltage follower can be selected to have a very high slew rate, e.g. 3000 V/us, such as Microchip's MIC920 operational amplifiers, meaning they have negligible propagation delays. Within the peak detector, however, there is an RC timing delay that may be on the order of about 100 nanoseconds in some implementations. The difference amplifier may introduce a propagation delay of 10-20 nanoseconds in the case of a voltage difference of about 50 mV to switch from a low output to a high output. Using a higher slew rate op amp could reduce that to a negligible delay on the order of picoseconds.

The remaining components, including the comparator, SR latch, and other logic elements, introduce negligible delays on the order of a few nanoseconds. Accordingly, it will be appreciated that the present detection circuit and method may detect and react to a fault condition within fractions of a microsecond. Taking all factors into account, the present detection circuit may enable detection and shutdown within about 500 nanoseconds to 7 microseconds, which is orders of magnitude faster than the few milliseconds required by statutory, compliance, or certification bodies or agencies, such as UL or IEC.

In some cases, it might be noted that the timing of the fault condition vis-à-vis the waveform of the sine wave may impact the detection speed, in that if the fault occurs at point of a zero-crossing of the sine wave, it may take some non-zero time for the fault to cause an amplitude distortion. In practical terms, most fault conditions exist for at least a few milliseconds meaning the zero-crossing time delay does not significantly contribute additional fault detection and clearing time.

Referring again to FIG. 3, as mentioned above the microcontroller 364 may be configured to control the sine wave generator 362 and, in particular, to determine the frequency at which the sine wave generator 362 is to generate a sine wave. In some implementations, the microcontroller 364 may be configured to cause the sine wave generator 362 to perform a frequency sweep of the transmission line 306 using the sine wave generator 362 in order to determine a measured resonant frequency for the line and, on that basis, to set the frequency at which the sine wave generator 362 is to operate.

The purpose of determining a resonant frequency is that it is a frequency at which the sinusoidal signal (standing wave) is most prone to distortion during a fault condition. That is, the attenuation of the standing wave will be most easily detected when the frequency of the standing wave is such that the standing wave at its peak amplitude. That frequency is partly dependent upon the 3 dB cutoff frequency of the RC filter formed by the cable's total resistance and total capacitance between the wave transmitter and the receiver, the total length of the cable, the cable termination at the receiving end of the signal (the transmitter 302). A termination much higher than the characteristic impedance of the cable ensures that a standing wave can be established by reflecting most or all of the incident sine wave.

The transmission line 306 may be modeled as an RLC circuit with a series R-L component and a parallel capacitance component. The characteristic impedance of the transmission line 306 may be expressed as:

$$Zo = \sqrt{\frac{R + j\omega L}{G + j\omega C}}$$

In the above expression, $Z_0$ is the characteristic impedance, R is the resistance per unit length, G is the conductance of the dielectric per unit length, L is the inductance per unit length, and C is the capacitance per unit length. The above expression is particularly applicable in the transition zone between high frequency and low frequency operation. At low frequency, the inductance and conductance are negligible and the impedance may be simplified as:

$$Z_0 = \sqrt{\frac{R}{j\omega C}}$$

A high frequency, the frequency terms dominate and the expression ends up reducing to:

$$Z_0 = \sqrt{\frac{L}{C}}$$

The gain cross-over frequency at which the impedance of the cable is the lowest is obtained by setting these expressions equal to each other and finding the frequency, which results in:

$$f = \frac{R}{2\pi L}$$

The cable may also act as a low pass filter whose 3 dB cutoff is given by:

$$f = \frac{1}{2\pi RC}$$

This is the maximum frequency that can propagate on the cable and form a standing wave, which can then serve as an upper threshold maximum frequency for the frequency sweep. In practice, the sweep may be designed to stop at a maximum frequency much lower than the theoretical maximum. The sweep may further be carried out with a lower threshold minimum frequency selected based on the gain cross-over frequency.

In one example, a 300 m cable resulted in a calculated gain crossover frequency of 25.4 kHz and a calculated 3 dB cutoff of 3.96 MHz. A calculated resonant frequency is 125 kHz. Using a frequency sweep from 25 kHz to 3.96 MHz, it was found that the maximum amplitude of the standing wave occurred at 900 kHz.

In another example, a different 300 m cable resulted in a calculated gain crossover frequency of 5.65 kHz and a calculated 3 dB cutoff of 440 kHz. A calculated resonant frequency is 125 kHz. Using a frequency sweep from 5.65 kHz to 440 kHz, it was found that the maximum amplitude of the standing wave occurred at 400 kHz.

In one example implementation, the microcontroller 364 is configured to cause the sine wave generator 362 to generate a sine wave having a frequency that varies from a set minimum frequency to a set maximum frequency. The minimum and maximums may be pre-set by an administrator in software or through a user interface. The values may be set in advance based on the characteristics of the transmission line 306, including its cable type and length.

The sine wave generator 362 generates the sine wave and varies the frequency over time from the minimum value to the maximum value. The microcontroller 364 may receive an input from the peak detector in the touch detection circuitry 334 reflecting the detected amplitude of the standing wave. On this basis, the microcontroller 364 identifies the point in time at which the maximum amplitude is detected and correlates that to the frequency used by the sine wave generator 362 at that time. Following the sweep, the microcontroller 364 sets the operating frequency of the sine wave generator 362 for fault detection at the frequency corresponding to the maximum amplitude observed during the frequency sweep.

A further advantage of methods and systems described in the present application is the ability to leverage them to conduct a handshake procedure for safe start-up of the transmission line. This may reduce or eliminate the risk of electrical arcs/faults. Because the transmitter and receiver are configured to superimpose a sine wave on the transmission line, the sine wave generation may be utilized to carry out a handshaking process prior to energizing of the cable with high voltage DC.

Figure 5:
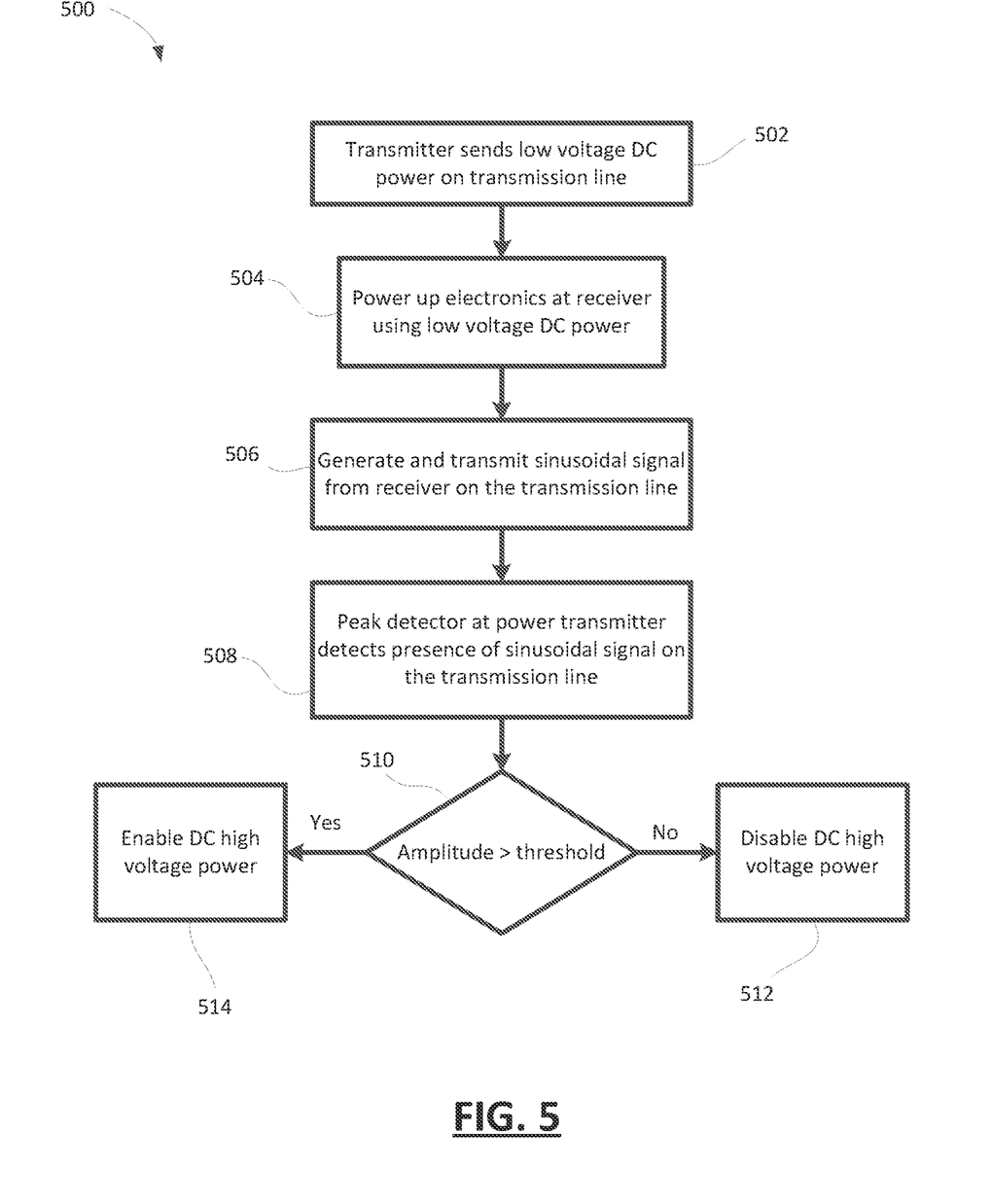
FIG. 5 shows, in flowchart form, one simplified example handshake method for a high voltage DC transmission line.

Reference is now made to FIG. 5, which shows, in flowchart form, one simplified example handshake method 500 for a high voltage DC transmission line. In this example, the DC power receiver end of the transmission line features an AC signal generator (e.g. a sine wave generator) for generating a sinusoid to be superimposed on the line for the purpose of fault detection, as described above.

The method 500 begins in operation 502 with the DC power transmitter generating and energizing the transmission line with a low-voltage DC signal, such as 24V, 48V, or some other relatively low DC voltage. The DC power transmitter may, in some cases, include an onboard switched mode power supply (SMPS) configured to generate the low voltage signal. This enables the DC power receiver at the other end of the transmission line to power up its electronics using the low voltage DC signal, as indicated by operation 504. The electronics may include a microcontroller, the AC signal generator, and associated circuitry.

The DC power receiver, having powered on its electronics, generates and transmits an AC signal on the transmission line in operation 506. The AC signal may be a sinusoidal signal at a pre-configured frequency.

The DC power transmitter includes a peak detector, which is configured to detect presence of the AC signal, as indicated by operation 508. Once it detects that an AC signal is on the transmission line, then it can be deduced that the receiving end is powered up and correctly connected to the line. In operation 510, in this example, the peak detector may assess whether the detected AC signal is above a preset threshold level. If so, then the receiving end is deemed to be connected and ready for high voltage DC power transmission. As a result, the DC power transmitter enables energizing of the line with high voltage DC in operation 514.

If the peak detector determined in operation 510 that the detected AC signal is below the preset threshold level, then it may indicate a fault or defect in the transmission line and/or connections and it may disable or prevent or forego connection of high voltage DC power, as indicated by operation 512.

It will be appreciated that it may be that some or all of the above-described operations of the various above-described example methods may be performed in orders other than those illustrated and/or may be performed concurrently without varying the overall operation of those methods. It will also be appreciated that some or all of the above-described operations of the various above-described example methods may be performed in response to other above-described operations.

Figure 6:
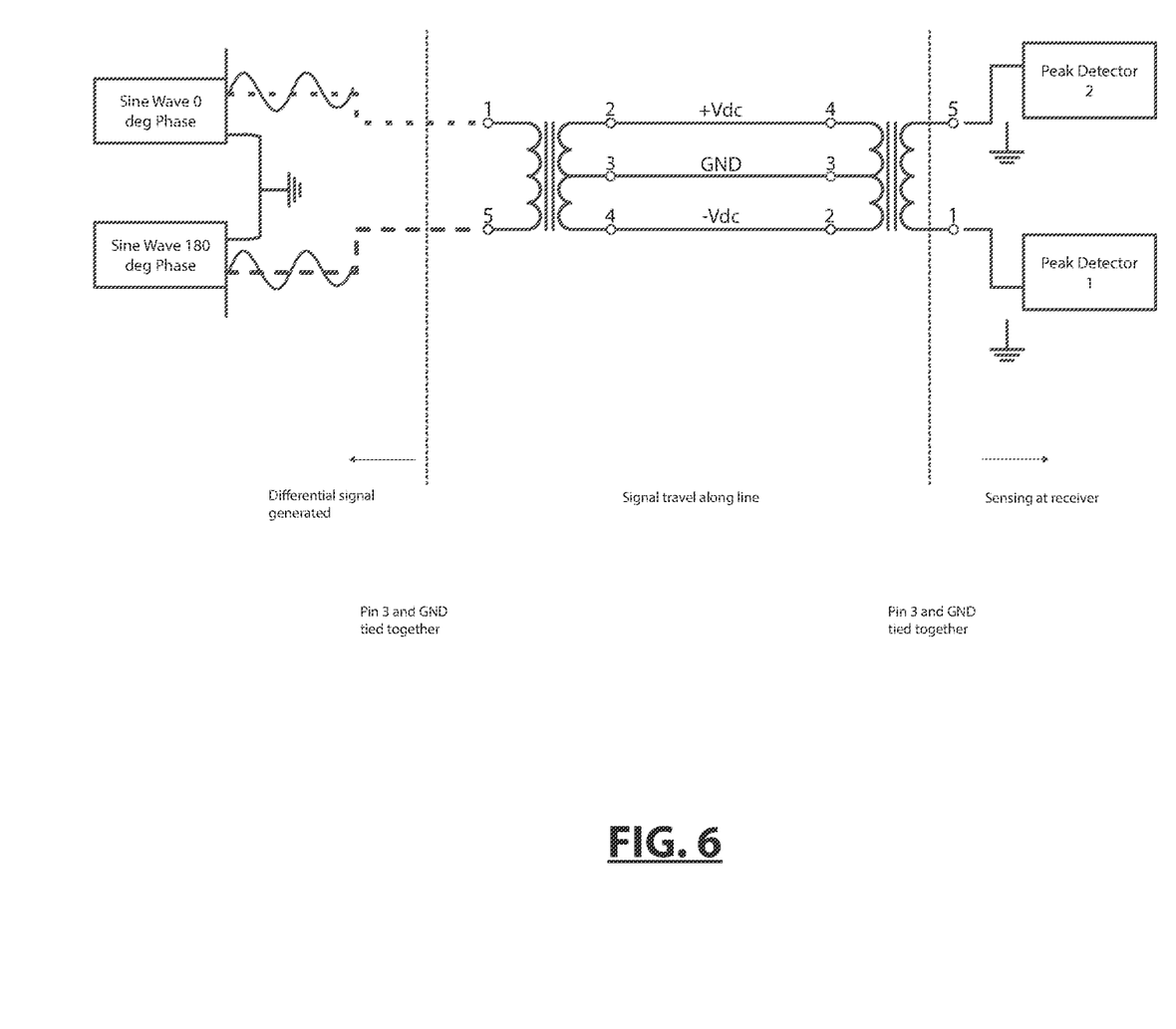
FIG. 6 shows an example circuit for implementing the handshake method in a three-wire system.

In the case of a two-wire transmission line, the method 500 may be implemented using a single sine wave generator and one peak detector at the power transmitter. In some situations involving a three-wire DC system it may be advantageous to use two sine wave generators, one of them configured to operate 180 degrees out-of-phase with the other, and two peak detectors at the opposite end of the transmission line. FIG. 6 diagrammatically shows an example circuit for such a three-wire system. This allows for doubling of the power that can be transmitted. This effectively doubles the available voltage without increasing the voltage with respect to ground (earth). This is a relatively safe way to achieve increased voltage without a commensurate increase in fault risk.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A fault detection system for detecting a fault condition on a direct current (DC) transmission line, the system comprising:
a transmitter including a DC source to energize a transmission line; and
a receiver connected to the transmission line to couple the transmission line to a load, and including a signal generator to generate a periodic signal at or near a resonant frequency and coupled to the transmission line through an impedance matching resistor,
wherein the transmitter includes a termination impedance higher than a characteristic impedance of the transmission line to reflect substantially all the periodic signal thereby establishing a standing wave on the transmission line, and
wherein the transmitter includes a first fault detection circuit coupled to the transmission line to detect an amplitude attenuation of the standing wave of more than a threshold amount and, in response, to disconnect the transmission line from the DC source.

2. The fault detection system of claim 1, wherein the resonant frequency is a frequency at which the standing wave on the transmission line is at a maximum amplitude.

3. The fault detection system of claim 1, wherein the first fault detection circuit includes an amplifier to amplify the standing wave to produce an amplified signal and a touch detection circuit to detect an attenuation of the amplified signal.

4. The fault detection system of claim 3, wherein the touch detection circuit includes a peak detector to output a peak voltage signal at the amplitude of the amplified signal, and attenuation detection circuitry for determining if the amplitude of the amplified signal decreases by more than the threshold amount.

5. The fault detection system of claim 4, wherein the touch detection circuit includes a first voltage follower and a second voltage follower in parallel with the first voltage follower and having a time delay, and wherein the first voltage follower and the second voltage follower are coupled to inputs of a difference amplifier and a comparator to detect a change in amplitude of more than the threshold amount.

6. The fault detection system of claim 1, wherein the first fault detection circuit includes a line discharge circuit configured to couple the transmission line to ground through a discharge resistor if the amplitude attenuation of the standing wave is more than the threshold amount.

7. The fault detection system of claim 6, wherein the line discharge circuit includes a MOSFET.

8. The fault detection system of claim 1, wherein the receiver includes a second fault detection circuit coupled to the transmission line to detect the amplitude attenuation of the standing wave of more than the threshold amount and, in response, to disconnect the transmission line from the load.

9. The fault detection system of claim 8, wherein the second fault detection circuit includes a second line discharge circuit configured to couple the transmission line to ground through a second discharge resistor if the amplitude attenuation of the standing wave is more than the threshold amount.

10. The fault detection system of claim 1, wherein the first fault detection circuit and the termination impedance are coupled to the transmission line through a blocking capacitor selected to block high voltage DC signal from the first fault detection circuit and the termination impedance.

11. The fault detection system of claim 1, wherein the termination impedance includes a termination resistor and a termination capacitor in series.

12. The fault detection system of claim 1, wherein the signal generator is a sine wave generator, and wherein the periodic signal is a sinusoidal signal.

13. The fault detection system of claim 12, wherein the receiver further includes a microcontroller coupled to the a receiver-side peak detector and configured to control the sine wave generator, and wherein the microcontroller is configured to cause the sine wave generator to perform a frequency sweep between a minimum frequency and a maximum frequency and, based on a peak voltage signal from the receiver-side peak detector, to determine the resonant frequency based on a maximum amplitude of the peak voltage signal.

14. The fault detection system of claim 1, wherein the periodic signal has a peak-to-peak amplitude between 10V and 24V.

15. The fault detection system of claim 1, wherein the DC transmission line is configured to operate at more than 60 VDC.

16. A fault detection system for detecting a fault condition on a direct current (DC) transmission line, the system comprising:
a transmitter including a power source to energize a transmission line with high voltage DC power; and
a receiver connected to the transmission line to couple the transmission line to a load, and including a signal generator to superimpose a sinusoidal signal on the high voltage DC power on the transmission line,
wherein the transmitter includes a termination impedance higher than a characteristic impedance of the transmission line to reflect substantially all the sinusoidal signal thereby establishing a standing wave on the transmission line,
wherein the transmitter includes a first fault detection circuit coupled to the transmission line through a first blocking capacitor and including first touch detection circuitry to detect an amplitude attenuation of the standing wave of more than a threshold amount and, in response, to disconnect the transmission line from the source and to couple the transmission line to ground through a first discharge resistor, and, wherein the receiver includes a second fault detection circuit coupled to the transmission line through a second blocking capacitor and including second touch detection circuitry to detect the amplitude attenuation of the standing wave of more than the threshold amount and, in response, to couple the transmission line to ground through a second discharge resistor.

17. The fault detection system of claim 16, wherein each of the first and second fault detection circuits include an amplifier to amplify the standing wave to produce an amplified signal and a touch detection circuit to detect an attenuation of the amplified signal.

18. The fault detection system of claim 17, wherein each touch detection circuit includes a peak detector to output a peak voltage signal based on the amplified signal, and attenuation detection circuitry to signal if the amplitude of the amplified signal decreases by more than the threshold amount.

19. The fault detection system of claim 18, wherein the attenuation detection circuitry includes a first voltage follower and a second voltage follower in parallel with the first voltage follower and having a time delay, and wherein the first voltage follower and the second voltage follower are connected to inputs of a difference amplifier and a comparator to detect a change in amplitude of more than the threshold amount.

* * * * *